Aug. 5, 1958  W. H. MURPHY  2,846,213
DOOR CONTROL MECHANISM FOR REFRIGERATED TRUCKS
Filed May 2, 1957  2 Sheets-Sheet 1
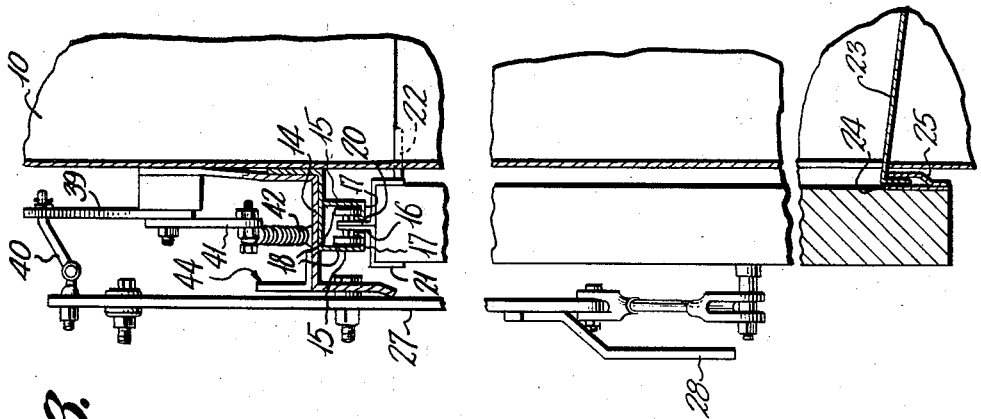
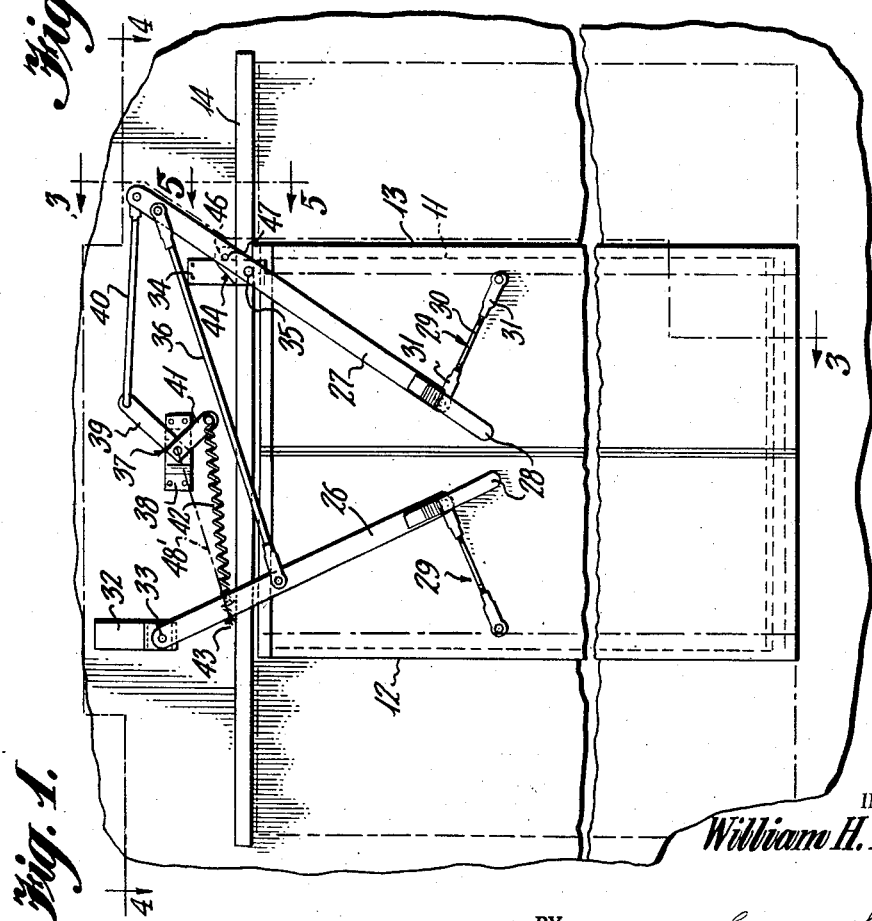
INVENTOR
*William H. Murphy*
BY *Mason, Fenwick & Lawrence*
ATTORNEYS

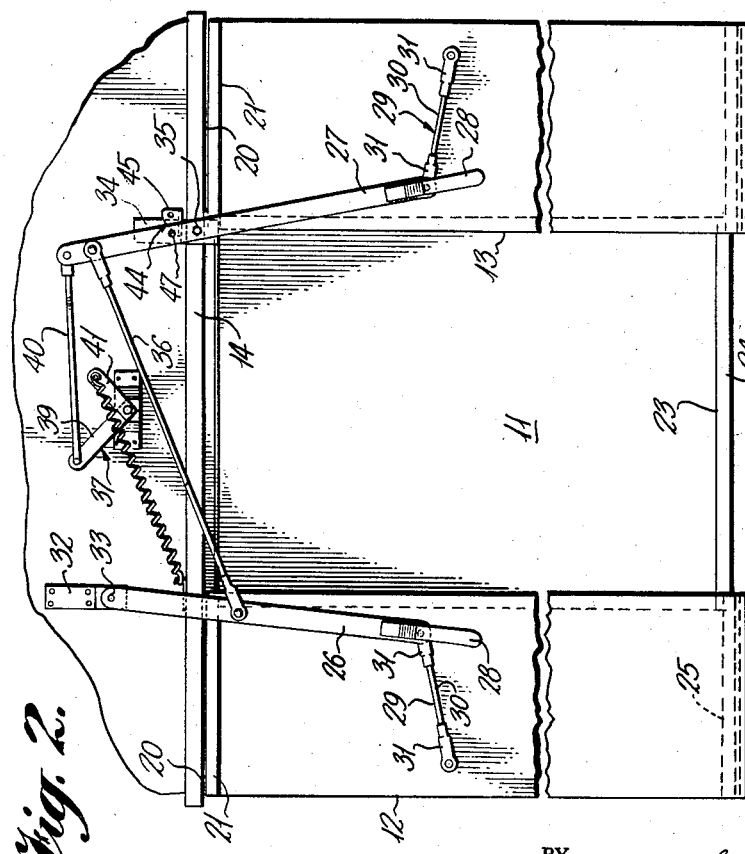

United States Patent Office 2,846,213
Patented Aug. 5, 1958

2,846,213

DOOR CONTROL MECHANISM FOR REFRIGERATED TRUCKS

William H. Murphy, Wilson, N. C.

Application May 2, 1957, Serial No. 656,523

3 Claims. (Cl. 268—48)

The present invention relates in general to sliding door control mechanisms, and more particularly to control mechanisms for operating a pair of sliding doors incorporated in refrigerated truck bodies and the like.

In many automotive vehicles, and particularly automotive vehicles of the type adapted for delivery purposes, sliding doors are provided in association with the cab of the vehicle in place of conventional hinge doors. This is particularly true where doors are required or desired to separate the driver's compartment from the load compartment of the vehicle, since hinged doors which are opened into the driver's cab would prevent normal utilization of the space within the driver's cab lying within the swinging arc of the door and present obstacles to efficient utilization of the space in the vehicle. It has been a frequent practice in recent years to provide sliding doors for separating the driver's compartment from the produce compartment in delivery vehicles. In the case of refrigerated truck bodies such as dairy product delivery trucks, the use of such sliding doors between the driver's compartment and the refrigerated compartment produce a heavy physical strain on the operator of the vehicle due to the heavy weight of the sliding doors required to provide sufficient insulation to maintain proper temperature conditions in the refrigerated compartment. Since the sliding doors in such delivery vehicles must be opened and closed many times each hour as the operator progresses along the delivery route, the strain of moving the heavy sliding doors becomes considerable. Due to the necessity of maintaining the close alignment between the sliding doors and the wall of the refrigerant compartment supporting the doors in order to preserve proper temperature conditions within the refrigerated compartment, guide tracks must be provided for the lower ends of the sliding doors as well as the upper ends. These guide tracks are usually in the form of upwardly opening troughs or channels which frequently become clogged with trash and other foreign matter due to the heavy traffic through the door openings and produce further interference with manipulation of the sliding doors.

An object of the present invention is the provision of a novel sliding door activating mechanism for a pair of sliding doors in delivery vehicles such as refrigerated trucks and the like for coordinating movement of the doors for ease of operation.

Another object of the present invention is the provision of a manual activating mechanism for double sliding doors of refrigerated vehicles and the like having a novel arrangement whereby a spring acts to supplement manual force of the operator to facilitate opening and closing of the doors.

Another object of the present invention is the provision of a manual activating mechanism for double sliding doors of refrigerated trucks and the like arranged to facilitate locking of the components by a padlock or the like when the doors are in closed position.

Another object of the present invention is the provision of a novel door suspension mechanism for double sliding doors of refrigerated trucks and the like.

Another object of the present invention is the provision of a novel door guide structure for maintaining double sliding doors in alignment and arranged to remain trash free to eliminate interference with proper door operation.

Other objects, advantages and capabilities of the present invention will become apparent from the following detail description, taken in conjunction with the accompanying drawings illustrating one preferred embodiment of the invention.

In the drawings:

Figure 1 is a front elevation of a sliding door control mechanism embodying the present invention, illustrated in position in a truck body and showing the doors and operating mechanism in a closed position.

Figure 2 is a similar view of the door operating mechanism showing the doors in open position.

Figure 3 is a vertical section view taken along the line 3—3 of Figure 1.

Figure 4 is a horizontal section view taken along the line 4—4 of Figure 1; and

Figure 5 is a fragmentary vertical section view taken along the line 5—5 of Figure 1.

Referring to the drawings wherein like reference characters designate corresponding parts throughout the several figures, the sliding door mechanism of the present invention is illustrated in assembled relation on the usual intermediate wall 10 of a refrigerated delivery truck which divides the driver's compartment from the refrigerated compartment. In such vehicles, the intermediate wall 10 is usually a heavily insulated wall at the forward end of the refrigerated compartment and is provided with a large door opening 11. The mechanism of the present invention includes a pair of horizontally sliding doors 12, 13 which are supported in alignment with each other in a plane paralleling and spaced slightly forwardly of the plane of the intermediate wall 10 for movement from a closed position covering and sealing the door opening 11, as illustrated in, to the open position illustrated in Figure 2. The two doors 12, 13 are supported on an upper track 14 which is preferably formed of two plates 15 of 14 gauge sheet steel bent to substantially L-shape arranged to face each other so as to provide a space 16 therebetween bounded by flanges at the adjacent sides of horizontal, laterally spaced track rails 17. Laterally aligned pairs of rollers 18 are connected together in pairs, by roller shafts 19 which extend through a vertically projecting web 20 of a sheet metal door cap 21 affixed to the upper ends of each of the doors 12, 13 to form a hanger therefor. Preferably, at least two pairs of rollers 18 are associated with each of the door caps 21 and are located adjacent the opposite ends of the door caps so as to suspend the doors 12, 13 from the upper track 14 at widely spaced points extending longitudinally of the track 14. The plates 15 forming the upper track 14 are suitably affixed to the intermediate wall 10 of the truck, and a strip of web belting 22 is affixed to the lintel of the door opening 11 and projects forwardly of the wall 10 into sealing engagement with the adjacent surfaces of the door caps 21.

The lower ends of the sliding doors 12, 13 are guided by a novel track arrangement which is especially designed to prevent collection of trash and foreign objects in the sill of the door opening 11 through which the operator passes to enter and leave the refrigerated compartment so as to minimize interference with proper sliding action of the doors 12, 13. To this end, the sill of the door opening 11 is provided with a lower track forming plate 23 which terminates in a downwardly projecting flange 24 which is spaced slightly forwardly of the intermediate wall 10 and is arranged to be received in upwardly opening channel members 25 associated with each door 12, 13 to guide the lower ends of the doors. The sides of these channel members 25 continuously embrace the flange 24 of the sill plate 23 throughout sliding movement of the doors 12, 13 to maintain the doors in a common plane precisely paralleling the surface of the intermediate wall 10.

The mechanism for actuating the doors 12, 13 comprises elongated operating levers 26, 27 associated with the doors 12, 13, respectively, the operating levers 26, 27 each having a handle 28 affixed to the lower end of its associated lever and projecting forwardly of the lever to a more accessible position. The lower ends of each of the operating levers 26, 27 are coupled to their associated doors 12, 13 by means of adjusting linkage members 29 each comprising an adjusting rod 30 threaded at the opposite ends thereof into clevises 31 bolted to one of the doors 12, 13 and one of the operating levers 26, 27.

The upper end of the operating lever 26 is pivotally coupled to a bracket 32 affixed to the wall 10 by means of a suitable machine bolt 33, and the lever 27 is pivoted intermediate its ends to a bracket 34 likewise affixed to the wall 10, the machine bolt 35 defining this pivotal connection for the lever 27. The two levers 26, 27 are connected together by a connecting rod 36 having suitable clevises at its opposite ends bolted to the operating levers at points spaced substantially equally and in opposite directions along the levers from their respective pivot bolts 33, 35.

An over-center spring mechanism is associated with the operating lever 27 to resiliently bias the doors 12, 13 toward fully opened position when the doors are slightly displaced from closed position and to bias the same toward closed position when they are displaced slightly from fully opened position. This mechanism comprises a bell crank lever 37 which is pivotally mounted at its center on a bracket 38 affixed to the wall 10. One bell crank arm 39 is coupled to the upper end of the operating lever 27 by linkage member 40. The other bell crank arm 41 is connected to one end of a coil spring 42, and the other end of the coil spring 42 is fixed to the upper track 14 by an anchor member 43.

Means are also provided to facilitate locking of the operating levers 26, 27 against displacement when the doors 12, 13 are in closed position. This means comprises a locking bracket 44 which is affixed to the mounting bracket 34 associated with the operating lever 27 and comprises an upwardly projecting plate or flange 45 lying immediately behind and extending in parallelism with the operating lever 27. The plate 45 is provided with an aperture 46 designed to register with an aperture 47 in the operating lever 27 when the lever is in door closing position to receive the shackle of a padlock 48 in the manner illustrated in Figure 5.

When the doors 12, 13 are in closed position, as illustrated in Figure 1, the doors may be easily shifted to the fully opened position of Figure 2 by moving either or both of the handles 28 associated with the operating levers 26, 27 away from the center line of the door opening 11. Assuming that the operator actuates the handle 28 associated with the operating lever 26, the operating lever 26 is moved in a clockwise direction about its pivot 33, and the displacement of the connecting rod 36 connected between the operating levers 26 and 27 produces a corresponding counterclockwise movement of the operating lever 27 about its pivot 35. Such movement results in movement of the doors 12 and 13 away from each other through the force applied to the doors by the linkage members 29. Also, as the operating lever 27 is shifted either directly or indirectly in a counterclockwise direction, movement of the upper end of the operating lever 27 imparts counterclockwise rotation to the arms 41 and 39 of the bell crank lever 37 through the linkage member 40. As the bell crank lever 37 progresses in a counterclockwise direction from the position illustrated in Figure 1, the end of the bell crank arm 41 to which the spring 42 is connected, progresses from a point below the axis indicated at 48' extending between the spring anchor member 43 and the pivotal axis of the bell crank lever 37 to a point above the axis 48'. Thus, as soon as the axis of the spring 42 passes upwardly through the axis 48', the spring will assist further counterclockwise rotation of the bell crank lever 37, and therefore assist movement of the operating levers 26, 27 to the position illustrated in Figure 2 wherein the doors 12, 13 are in fully opened position. In like manner, closing of the doors 12, 13 as assisted by the spring 42, since movement of the lower ends of the levers 26, 27 toward each other affects clockwise rotation of the bell crank lever 37, and the spring 42 assists movement of the doors 12, 13 toward each other after the spring 42 is shifted downwardly through the axis 48'.

The action of the door supporting rollers 18 running in the upper track 14 and of the lower track of this arrangement coact to maintain the doors 12, 13 in proper vertical alignment throughout actuation of the doors and eliminate the provision of any upwardly opening channel spanning the sill of the door opening 11 which might readily become clogged with trash and interfere with proper sliding action of the doors. This particular structure also affords a convenient facility for locking the doors in closed position by applying a padlock through readily accessible components of the door control mechanism.

While only one preferred embodiment of the invention has been particularly shown and described, it is apparent that other modifications may be made in the invention without departing from the spirit and scope thereof, and it is desired, therefore, that only such limitations shall be placed thereon as are imposed by the prior art and are set forth in the appended claims.

I claim:

1. A control mechanism for a pair of sliding doors associated with a door opening in an interior wall separating the refrigerated compartment of a refrigerated truck from the operator's cab comprising an elongated horizontal track supported on said wall above said opening, rollers journaled on each of said doors for suspending the doors from said track for movement in a plane parallel and closely adjacent to said wall, a pair of first and second laterally spaced, elongated operating levers lying in the same vertical plane paralleling said wall and disposed in approximately horizontal alignment with each other, each associated with one of said doors, means pivotally supporting said first operating lever on said wall above the door opening forming a fulcrum point in the upper end of said first operating lever, means pivotally supporting said second operating lever on said wall at a fulcrum point intermediate the ends of said second operating lever, a connecting rod pivotally connecting said first and second operating levers at points spaced below and above the fulcrum points thereof, respectively, and located substantially equally distant from said fulcrum points, adjustable link members each pivotally connected at one end to the lower end of one of said operating levers and at the other end to one of said doors for transmitting motion from said levers to said doors, a bell crank lever having right angularly related arms lying in a vertical plane, means pivotally supporting said bell crank lever at the juncture of said arms on said wall at a position located between said operating levers, above said door opening, and at a vertical level lying between the fulcrum point and the upper end of said second operating lever, a link member connected between one of said bell crank lever arms and the upper end of said second operating lever, an elongated coil spring connected at one end to the end of the other arm of said bell crank lever, and fixed anchor means anchoring the other end of said spring to said wall at a point projected beyond the pivotal axis of said bell crank lever from said second operating lever and located to position said spring to one side of the pivotal axis of said bell crank lever when said doors are in fully closed position and position the spring on an opposite side of the bell crank lever axis when the doors are in fully open position whereby the spring is shifted over the pivotal axis of the bell crank lever during movement of the bell crank between door opening and door closing positions to bias the bell crank lever and said operating levers in a direction supplementing the manual force of the operator when the spring passes over said pivotal axis.

2. The combination recited in claim 1 wherein a locking plate member in the form of an angle bracket is mounted in fixed relation to said wall with one of the flanges thereof underlying and paralleling said second operating lever and disposed immediately above the intermediate fulcrum point thereof, said second operating lever and the flange of said angle bracket each having an aperture therein positioned to be brought into registry with each other to receive a padlock shackle therethrough when the operating levers are in door closing position to lock th operating levers against movement.

3. The combination recited in claim 1, wherein guide track means are provided for the lower edges of said doors comprising upwardly opening channel members formed of sheet metal affixed to each of said doors adjacent the lower edges of the doors, said channel members lying slightly above the lower edges of said doors along the surfaces of the doors facing the refrigerated compartment and extending substantially the full width of their associated doors, and a sill member for said door opening extending the width of the door opening and formed of sheet metal having a planar portion forming a tread for the sill of the door opening entirely covering the sill and inclining downwardly and inwardly of the refrigerated compartment, said planar portion terminating at the forward edge thereof in a downwardly projecting flange lying in a plane paralleling and spaced slightly forwardly of said wall and extending into said channel members to guide the same throughout movement of said doors between open and closed positions.

References Cited in the file of this patent
UNITED STATES PATENTS

| | | |
|---|---|---|
| 934,529 | Holcomb | Sept. 21, 1909 |
| 1,992,099 | Smith | Feb. 19, 1935 |
| 2,686,577 | Hoppenjans | Aug. 27, 1954 |
| 2,723,848 | Mansmann | Nov. 15, 1955 |